United States Patent
Bradley (10) Patent No.: US 10,927,977 B2
(45) Date of Patent: Feb. 23, 2021

(54) CONCEALED SAFETY FASTENERS FOR COMMUNICATION LINES

(71) Applicant: OFS Fitel, LLC, Norcross, GA (US)

(72) Inventor: Kelvin B Bradley, Lawrenceville, GA (US)

(73) Assignee: OFS Fitel, LLC, Norcross, GA (US)

( * ) Notice: Subject to any disclaimer, the term of this patent is extended or adjusted under 35 U.S.C. 154(b) by 44 days.

(21) Appl. No.: 16/184,366

(22) Filed: Nov. 8, 2018

(65) Prior Publication Data

US 2020/0072389 A1 Mar. 5, 2020

Related U.S. Application Data

(60) Provisional application No. 62/723,599, filed on Aug. 28, 2018.

(51) Int. Cl.
| | | |
|---|---|---|
| *F16L 3/06* | (2006.01) | |
| *F16B 39/10* | (2006.01) | |
| *F16B 47/00* | (2006.01) | |

(52) U.S. Cl.
CPC .............. *F16L 3/06* (2013.01); *F16B 39/106* (2013.01); *F16B 39/10* (2013.01); *F16B 47/00* (2013.01)

(58) Field of Classification Search
CPC ....... F16L 3/06; F16L 3/08; F16L 3/22; F16B 39/106; F16B 47/00
USPC ........... 248/74.5, 65, 75, 56, 49, 693, 228.8, 248/230.8; 24/16 PB, 17 B, 300, 301; 174/59
See application file for complete search history.

(56) References Cited

U.S. PATENT DOCUMENTS

| | | | | | |
|---|---|---|---|---|---|
| 2,886,270 | A | * | 5/1959 | Wendela | F16L 3/04 248/74.5 |
| 3,430,903 | A | * | 3/1969 | Mathes | H02G 3/32 248/68.1 |
| 3,809,798 | A | * | 5/1974 | Simon | H02G 3/0633 174/59 |
| 4,260,123 | A | * | 4/1981 | Ismert | F16L 3/12 174/166 R |
| 4,410,226 | A | * | 10/1983 | Adduci | H02G 3/10 174/138 F |
| 5,338,898 | A | * | 8/1994 | Luciano | H01R 4/70 174/138 F |
| 5,791,936 | A | * | 8/1998 | Nicholson | H01R 13/5213 439/521 |

(Continued)

*Primary Examiner* — Nkeisha Smith
(74) *Attorney, Agent, or Firm* — Law Offices of Leo Zucker, Esq.

(57) ABSTRACT

A fastener for communication lines includes a flat metallic body having an opening for a metallic mounting screw. A distal end of the body is configured to capture a line previously installed along a building surface via an adhesive or other non-metallic fastener. A cover has an open top, and a bottom wall having an opening that aligns with the opening in the fastener body when the cover is disposed over the body. The screw is inserted through the top of the cover, and the openings in the bottom wall and the fastener body, to mount the fastener body together with the cover at a position on the building surface where the fastener captures the line securely. The line is thus prevented from collapsing and interfering with responders if the adhesive fails during a building fire. The fastener is concealed by closing the cover top with an associated cap.

9 Claims, 5 Drawing Sheets

(56) References Cited

U.S. PATENT DOCUMENTS

| | | | | |
|---|---|---|---|---|
| 5,893,538 A * | 4/1999 | Onishi | ............... | F16L 3/24 248/65 |
| 5,973,271 A * | 10/1999 | Fujita | ............... | F16L 5/10 174/152 G |
| 6,225,000 B1 * | 5/2001 | Pavlik | ............... | H01M 2/34 429/175 |
| 6,405,983 B1 * | 6/2002 | Goj | ............... | A47G 1/17 248/205.1 |
| 6,644,603 B2 * | 11/2003 | Bailleux | ............... | H02G 3/263 248/302 |
| 7,770,851 B2 * | 8/2010 | Michaud | ............... | F16L 3/04 248/65 |
| 8,302,927 B2 * | 11/2012 | Wright | ............... | A01D 34/001 248/156 |
| 8,342,460 B2 * | 1/2013 | Binkert | ............... | F16B 19/1081 248/71 |
| 8,567,742 B2 * | 10/2013 | Sizelove | ............... | H01Q 1/1207 248/505 |
| 9,772,049 B2 * | 9/2017 | Billimack | ............... | F16L 3/04 |
| 10,283,950 B2 * | 5/2019 | Gintz | ............... | H02G 3/32 |
| 2007/0102610 A1 * | 5/2007 | Katou | ............... | B60R 7/10 248/304 |
| 2010/0096513 A1 * | 4/2010 | Beebe | ............... | E04H 4/14 248/75 |
| 2012/0037766 A1 * | 2/2012 | Buras, Jr. | ............... | F16L 3/137 248/68.1 |
| 2012/0145838 A1 * | 6/2012 | Chiu | ............... | H02G 3/32 248/74.2 |
| 2012/0217354 A1 * | 8/2012 | Walraven | ............... | F16L 3/1025 248/74.1 |
| 2014/0217244 A1 * | 8/2014 | Shiga | ............... | B60R 16/0215 248/49 |
| 2016/0003378 A1 * | 1/2016 | Frizzell | ............... | H02G 3/32 248/74.5 |
| 2016/0010764 A1 * | 1/2016 | Dworak, Jr. | ............... | F16L 3/1058 248/72 |
| 2016/0178090 A1 * | 6/2016 | Schilling | ............... | F16L 3/237 248/68.1 |

\* cited by examiner

CONCEALED SAFETY FASTENERS FOR COMMUNICATION LINES

CROSS REFERENCE TO RELATED APPLICATION

This application claims priority under 35 U.S.C. § 119(e) of U.S. Provisional Patent Application No. 62/723,599 filed Aug. 28, 2018, titled Cable Clips for Invisilight, the entire contents of which are incorporated by reference.

BACKGROUND OF THE INVENTION

Field of the Invention

The present invention relates to fasteners for attaching communication lines including optical fibers and cables to exposed structural surfaces inside buildings.

Discussion of the Known Art

Indoor optical network terminals (ONTs) are being deployed at the premises of fiber optic network users worldwide, at an increasing rate. As used herein, the term premises means a living unit, e.g., a home, office, or apartment, which is or may be occupied by a user of services offered by a fiber optic network provider. Such services can include, for example, Internet access, telephony, television, voice and music broadcasts, and other information and data streams that require the installation of one or more fibers at the premises. The term fiber is used broadly herein to mean an optical fiber that is buffered and/or jacketed, as well as a fiber optic cable that contains one or more optical fibers. Also, a multi-dwelling unit (MDU) building refers to a building that contains a number of premises.

An ONT is typically located on a desktop or shelf near a TV set top box, a cable modem, and/or other electronic devices to which the ONT is connected inside a given user's premises. A procedure for installing a fiber between the ONT and a network access module usually mounted at or near an entry point to the premises, is offered by OFS Fitel, LLC under the registered mark InvisiLight. Using a consumer grade, low odor, nonhazardous water based adhesive, buffered and jacketed optical fibers are securely bonded along exposed walls, ceilings, and moldings at the premises between the ONT and the network access module, with little if any adverse visual impact.

Safety issues have arisen over fiber installations at premises inside buildings, and along building hallways and evacuation routes, with respect to fibers and other cables and wires that are attached to exposed building structures using only non-metallic fastening devices. For example, in the United Kingdom, firefighter injuries and deaths have been attributed to premature failures of cables and wires to stay attached to their supporting structures in the presence of flames. Once detached, the cables hang freely and will interfere with the movement of responders inside a burning building. Moreover, hanging cables have become entangled with firefighter uniforms and breathing apparatus leaving the responders unable to escape before exhausting their air supply. UK investigators concluded that if cables and wires are not installed in a way to keep them attached to their supporting structure during a fire, responders will always be at risk of becoming dangerously entangled.

To remedy the foregoing concerns, British Standard (BS) 7671 (July 2018) now includes the following regulation covering building wiring systems:

Regulation 521.10.202
Wiring systems shall be supported such that they will not be liable to premature collapse in the event of fire.
Note 1: Wiring systems hanging across access or egress routes may hinder evacuation and firefighting activities.
Note 2: Cables installed in or on steel cable containment systems are deemed to meet the requirements of this regulation.
Note 3: This regulation precludes, for example, the use of non-metallic cable clips or cable ties as the sole means of support where cables are clipped direct to exposed surfaces or suspended under cable trays, and the use of non-metallic cable trunking as the sole means of support, of the cable therein.
Note 4: Suitably spaced steel or copper clips, saddles or ties are examples that will meet the requirements of this regulation.

Also, BS 5839-1:2017 titled Fire Detection and Fire Alarm Systems for Buildings, states the following in Clause 26—Cables, Wiring, and Other Interconnections:

26.2 f) Methods of cable support should be non-combustible and such that circuit integrity is not reduced below that afforded by the cable used, and should withstand a similar temperature and duration to that of the cable, while maintaining adequate support . . . .
[T]his recommendation precludes the use of plastic cable clips, cable ties, or trunking, where these products are the means of cable support . . . .
Experience has shown that the collapse of cables supported only by plastic cable trunking, can create a serious hazard for firefighters, who could become entangled in the cables.

Further, BS 476 titled Fire tests on building materials and structures, Part 20: 1987—Method for determination of the fire resistance of elements of construction, Appendix A, Section A.2.1 (FIG. 2), implies that:

[U]pon initiation of a fire, temperatures can exceed 1000 deg. C., within 2 hours. Exposure to such extreme temperatures can cause most non-metallic, polymeric materials to melt, burn, or decompose very quickly, allowing cables, supported using these materials, to detach from walls and collapse.

In addition, per Electrical Safety First (UK), Best Practice Guide 4 (May 2015), periodic inspections are performed by competent inspectors to identify any damage, deterioration, defects, dangerous conditions, and noncompliance with the above requirements of BS 7671. When non-compliance due to inadequate support of cables in escape routes is observed during inspection, a C2 classification code, meaning potentially dangerous, must be assigned. The code requires that remedial action be taken as a matter of urgency to remove the source of potential danger.

If not already enacted, fire safety standards similar to BS 7671 are likely to be adopted in countries and cities outside the UK as well. There are concerns, however, that existing metallic fasteners of the kind used to attach cables to exposed building structures are not visually aesthetically pleasing. For example, while the use of conventional metallic cable staples would satisfy BS 7671 in most cases, staples have been rejected by many users who opt instead to install aesthetically pleasing moldings or conduits in order to hide all cables inside their premises from view. Staples can also physically damage an underlying wall or molding, and break a cable fiber or wire if the staples are not carefully driven in place.

Figure 1:
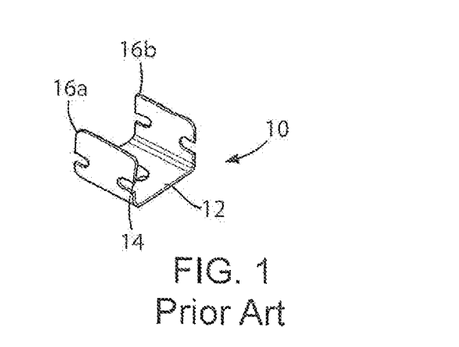
FIG. 1 shows a known metal safety clip for securing cables to an exposed building structure.
Figure 2:
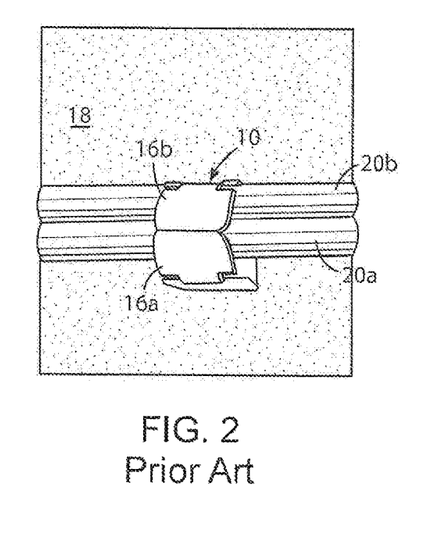
FIG. 2 shows the clip in FIG. 1 when closed about cables to be secured by the clip.

Metallic cable clips claimed to meet the requirements of BS 7671 are commercially available, and some examples are shown in FIGS. 1 to 4 of the present application. FIG. 1 shows a generally U-shaped cable clip 10 sold under the mark Safe-D U-Clip. The clip has a central flat base 12 with an opening 14 for a fastening screw or nail, and two ears 16a, 16b projecting upward from opposite sides of the base 12. In FIG. 2, the clip 10 is fastened to a supporting surface 18, and two cables 20a, 20b are secured by urging the ears 16a, 16b of the clip 10 toward one another and against the circumference of the cable jackets.

Figure 3:
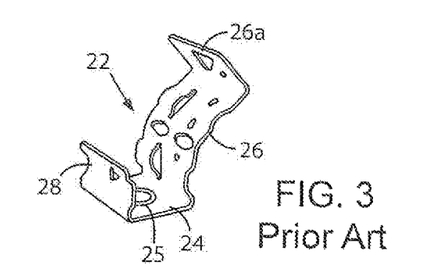
FIG. 3 shows another known metal safety clip for securing cables to an exposed building structure.

FIG. 3 shows another known clip 22 which is generally L-shaped. The clip 22 has a flat base 24 with an opening 25 for a fastening screw or nail, a long side 26 projecting upward from one side of the base 24, and a short side 28 projecting vertically from the opposite side of the base 24. After a cable is passed over the base 24, the long side 26 of the clip 22 is urged over the circumference of the cable jacket, and a free end 26a of the long side 26 is latched against the short side 28 of the clip to enclose the cable securely inside the clip.

Figure 4:
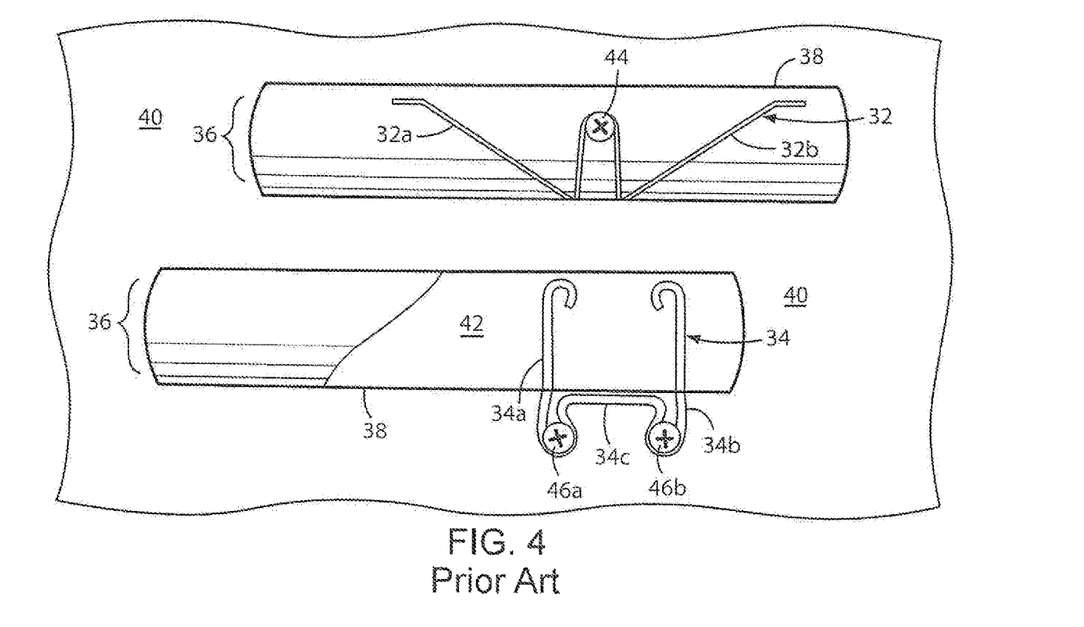
FIG. 4 shows two known metal safety clips for securing a number of fibers contained in a trunking, to an exposed building structure should the trunking fail in the event of a fire.

FIG. 4 shows two metal wire clips 32, 34 configured and arranged to ensure that a number of fibers 36 contained inside a plastics trunking 38 will stay secured against an underlying supporting structure 40, should the trunking 38 soften to a degree where the fibers 36 are no longer constrained from hanging freely away from the structure 40. Clip 32, in the top half of FIG. 4, is generally W-shaped and installed while a trunking cover 42 (shown in the bottom half of FIG. 4) is removed. Outside arms 32a, 32b of the clip 32 extend over the fibers 36 between the outside edges of the trunking 38. A mounting screw 44 is inserted through an opening formed at the center of the clip 32 and through another opening in a back wall of the trunking 38. The screw 44 is then threaded into the underlying supporting structure 40, and the trunking cover 42 is snapped over the fibers 36 inside the trunking.

Clip 34, in the bottom half of FIG. 4, is applied after the cover 42 is snapped onto the trunking 38 with the contained fibers 36, alternatively or in addition to the use of the clip 32. The clip 34 is generally U-shaped, wherein opposite legs 34a, 34b of the clip extend over the outside surface of the trunking cover 42 between the outside edges of the trunking 38. A base 34c of the U-shaped clip 34 is disposed beneath the lower outside edge of the trunking 38 as viewed on FIG. 4. Openings are formed at the corners of the clip base 34c for inserting mounting screws 46a, 46b that can be threaded directly into the underlying supporting structure 40.

While the known metal clips may be functionally adequate, they do not address users' desires for low visibility and pleasing aesthetics inside their premises, or at other locations inside an MDU building where the users reside. That is, none of the known fasteners or clips is configured to be easily hidden or concealed where the fasteners are deployed. Moreover, none of the known metal fasteners are intended for use with fibers or cables previously installed using a non-metallic adhesive, or plastics fasteners or clips.

Accordingly, there is a need for metallic fasteners for use with optical fibers, cables, and wires initially secured to exposed building structures only by non-metallic means such as adhesives or plastics clips, and which will ensure that such lines will not become detached and hang freely if a fire causes their initial securing means to fail. There is also a need for such metallic fasteners that can be mounted on the supporting structures easily and quickly, and be concealed so as to have little if any adverse visual impact when installed.

SUMMARY OF THE INVENTION

According to the invention, a fastener for communication lines includes a metallic mounting screw, and a flat metallic fastener body having an opening for passing the mounting screw. A distal end of the fastener body is configured to capture a communication line previously installed along a building surface via an adhesive or other non-metallic fastening means.

A cover has an open top, and a bottom wall of the cover has an opening formed to align with the opening in the fastener body when the cover is disposed over the fastener body. The mounting screw is inserted through the open top of the cover, the opening in the bottom wall of the cover, and the opening in the fastener body, to mount the fastener body together with the cover at a position on the building surface where the fastener captures the line securely. The line is thus prevented from collapsing and interfering with responders if the adhesive fails during a building fire. The fastener body is concealed by closing the top of the cover with an associated cap.

For a better understanding of the invention, reference is made to the following description taken in conjunction with the accompanying drawing and the appended claims.

DETAILED DESCRIPTION OF THE INVENTION

The present invention provides improved, aesthetically pleasing metallic safety fasteners that can prevent premature collapse of optical fibers, cables, and other communication lines during a building fire, including lines previously installed only by the use of non-metallic adhesives or fasteners.

Figure 5:
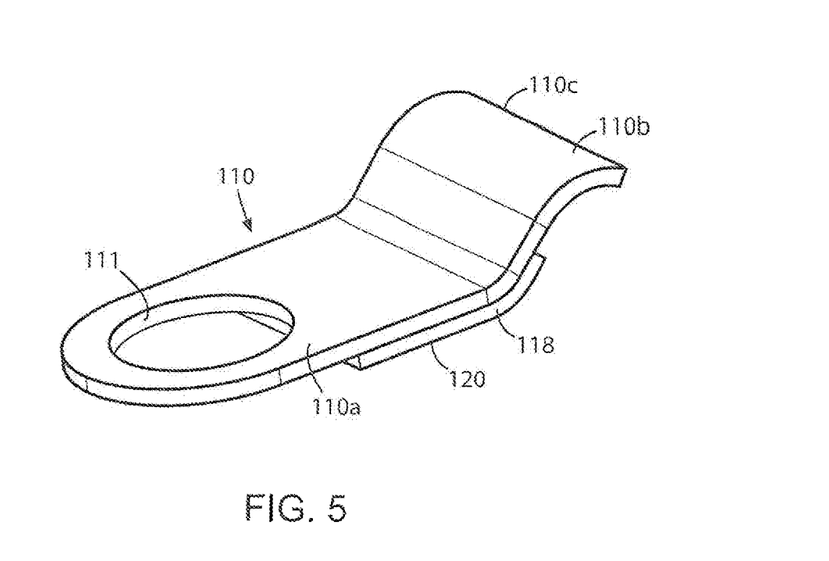
FIG. 5 is an isometric view of a first embodiment of a safety fastener for communication lines according to the invention.
Figure 6:
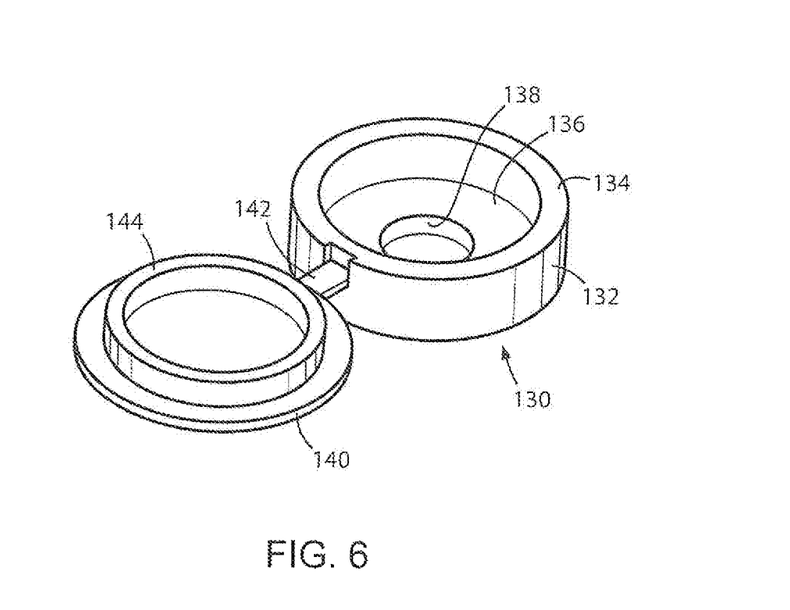
FIG. 6 is an isometric view of a cover for the safety fastener in FIG. 5.
Figure 7:
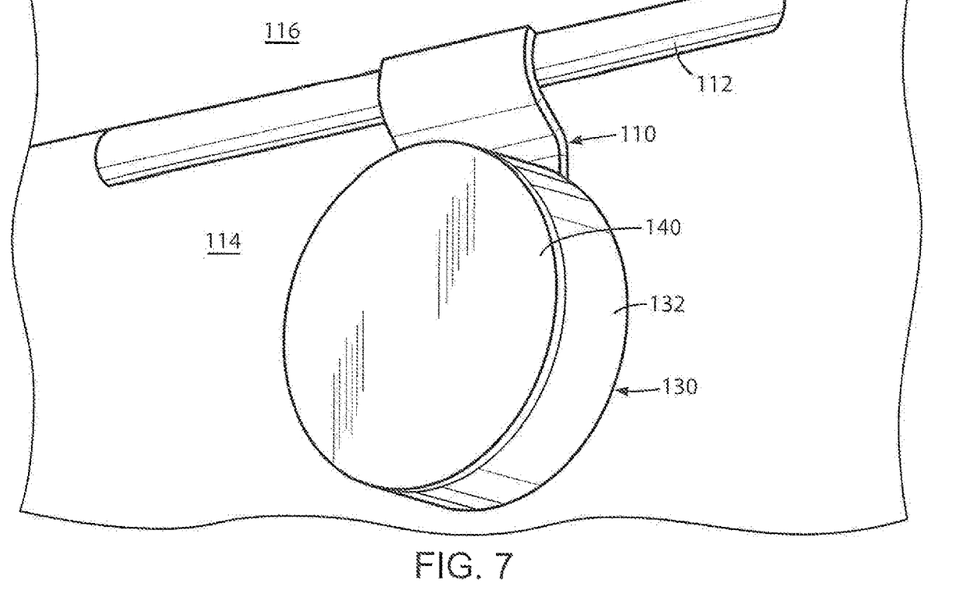
FIG. 7 is a view showing the fastener of FIG. 5 when mounted on a wall with the cover of FIG. 6 to support an installed fiber.

A first embodiment of a metallic safety fastener 110 according to the invention is shown in FIGS. 5 to 7. In the illustrated embodiment, fastener 110 is configured to capture an optical fiber 112 that was previously installed using, e.g., an adhesive along an interface between a wall 114 and a ceiling 116 in a MDU building hallway. See FIG. 7. One or more fasteners 110 may also be deployed to retain fibers initially installed along interfaces between two vertical walls, a wall and a wall molding, or a wall and a door frame, whether in a building hallway or evacuation route, or inside a user premises in the building.

The fastener 110 has a generally elongated flat body 110a, a distal end 110b of which has a straight forward edge 110c. The distal end 110b is arched or otherwise configured to capture the fiber 112 and to retain it securely against the wall 114 if the adhesive used to install the fiber decomposes or fails during the course of a building fire. The fastener body 110a has an opening 111 for passing a metallic mounting screw, as explained below.

Fastener 110 can be made, for example, by stamping a flat sheet of type 301 or 304 stainless steel, and forming the distal end 110b as desired. The fastener 110 may also be finished with a powder coating to have a desired color, e.g., white. One side of a double-sided tape 118 is adhered to a bottom surface of the fastener 110, and a release liner 120 is applied to the exposed side of the tape 118 to facilitate the positioning and installation of the fastener 110. That is, one or more fasteners 110 can be deployed by removing the release liner 120 from the tape 118 on the bottom of each fastener 110, and adhering the fastener on the wall 114 at a position where the fiber 112 is captured at the distal end 110b of the fastener as in FIG. 7.

Each fastener 110 is provided with an associated screw cover 130 shown in FIG. 6. In the illustrated embodiment, the cover 130 is formed of a polymeric or equivalent material that meets all applicable fire and safety codes at the installation site. Cover 130 has a body 132 defined by a circular cylindrical wall 134, and a bottom wall 136 having a central opening 138 for passage of a metallic mounting screw. A circular cap 140 is hinged at 142 to the top of the wall 134 of the cover body, and the cap 140 has a circular lip 144 that protrudes from the inside surface of the cap. The outside diameter of the lip 144 is set so that when the cap 140 is pressed into the opening at the top of the cylindrical wall 134, the cap 140 stays in a closed position as shown in FIG. 7.

Once the fastener body 110a is positioned on the wall 114 so that the distal end 110b of the body securely captures the fiber 112, the cover 130 is disposed over the fastener body 110a so that the opening 138 in the bottom wall 136 of the cover body is aligned within the opening 111 in the fastener body 110a. The fastener 110 and the cover 130 are then mounted together on the wall 114 using a suitable metallic mounting screw, e.g., a drywall screw, a multi-purpose "SPAX" screw, or a Wall Dog screw. The mentioned screws are preferred since they can be threaded directly and securely into the wall 114 without the use of polymeric screw anchors which could soften and fail at high temperatures. The cover cap 140 is then closed, thereby concealing the mounting screw and the fastener body 110a from open view as shown in FIG. 7.

A second embodiment of a metallic safety fastener 150 according to the invention is shown in FIGS. 8 to 11. Like the fastener 110, fastener 150 is configured to capture a fiber 152 previously installed via an adhesive along an interface between, e.g., a building hallway wall 154 and ceiling 156, and to retain the fiber 152 securely against the wall 154 if the adhesive used to install the fiber fails from exposure to heat or otherwise. One or more fasteners 150 can also be deployed to retain fibers initially installed along interfaces between two vertical walls, a wall and a wall molding, or a wall and a door frame, whether in a building hallway or evacuation route, or inside a user premises at the building.

Figure 8:
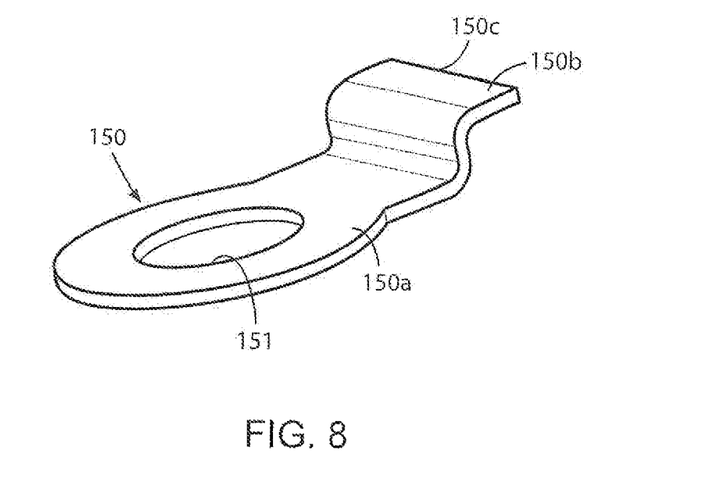
FIG. 8 is an isometric view of a second embodiment of a safety fastener for communication lines according to the invention.

The fastener 150 has an elongated generally flat body 150a, a distal end 150b of which has a straight forward edge 150c. The distal end 150b is arched or otherwise configured to capture the fiber 152 and to retain it securely against the wall 154 if the adhesive used to install the fiber decomposes or fails during the course of a building fire. The fastener body 150a has an opening 151 to allow passage of a metallic mounting screw as explained below. Like the fastener 110, the fastener 150 can be made by stamping a flat sheet of type 301 or 304 stainless steel, and forming the distal end 150b of the fastener body 150a as desired.

Figure 9:
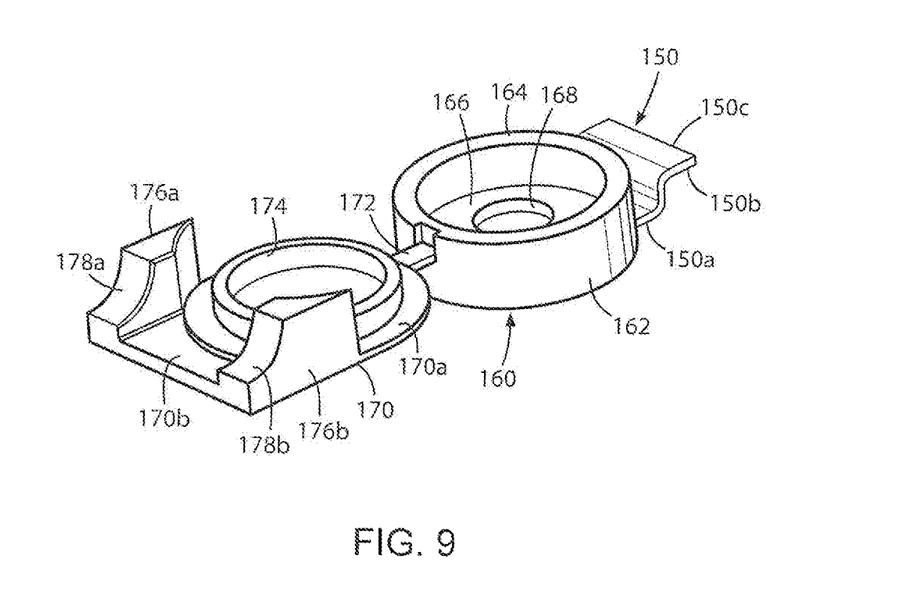
FIG. 9 is an isometric view of the safety fastener in FIG. 8 with a cover overmolded on the fastener.
Figure 10:
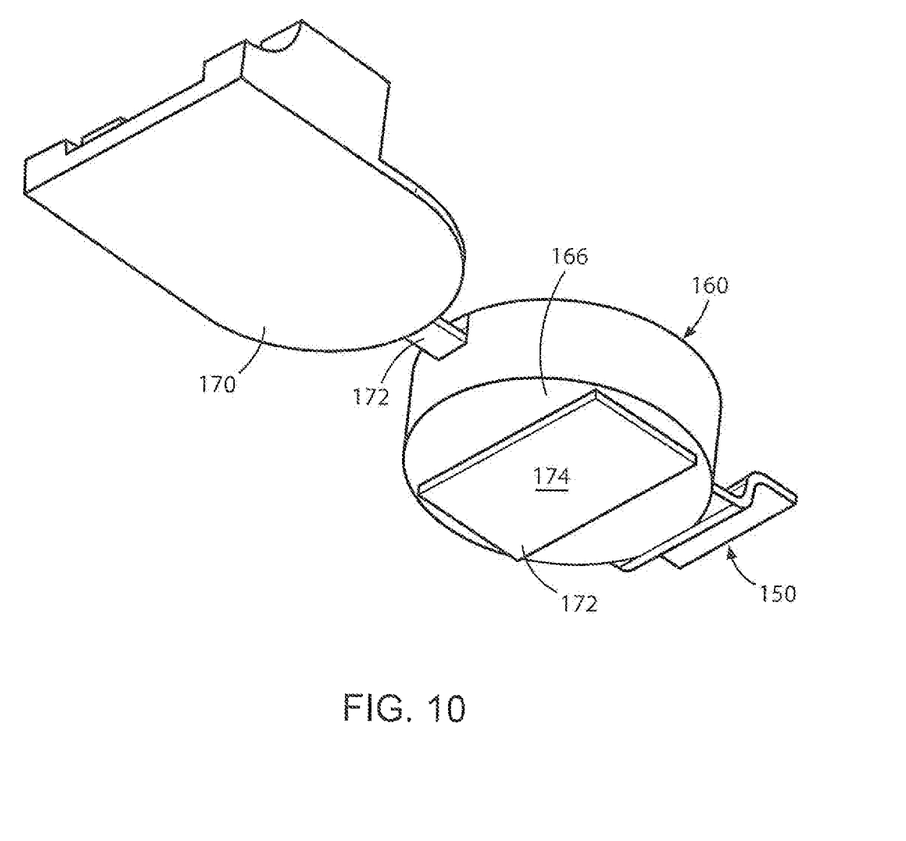
FIG. 10 is a view of the covered fastener in FIG. 9, as seen from the bottom.
Figure 11:
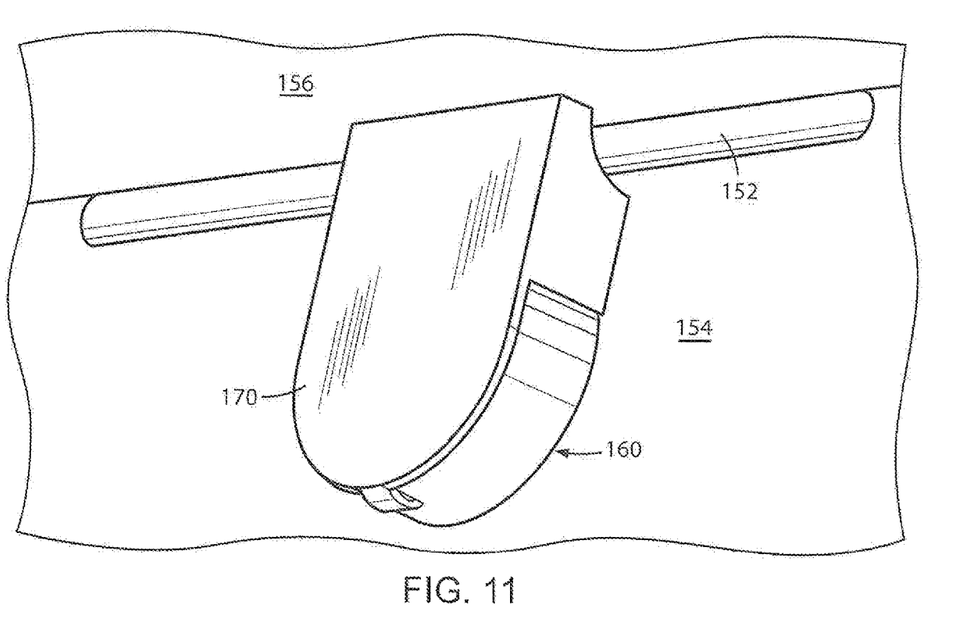
FIG. 11 is a view showing the covered fastener in FIG. 9 when mounted on a wall to support an installed fiber.

Unlike the fastener 110, however, the fastener 150 is insert molded within a fastener cover 160 shown in FIGS. 9 to 11. In the illustrated embodiment, the cover 160 is formed of a polymeric or equivalent material that meets all applicable fire and safety codes at the installation site. The cover 160 has a cover body 162 defined by a circular cylindrical wall 164, and a bottom wall 166 having a central opening 168 for passage of a metallic mounting screw. When overmolding the cover 160, the fastener body 150a is inserted into the mold so that the opening 151 in the fastener body 150a will be aligned with the opening 168 in the bottom wall 166 of the molded cover body 162.

Cover 160 also has a generally D-shaped cap 170 a proximal portion 170a of which is hinged at 172 to the top of the cylindrical wall 164 of the cover body 162. A circular lip 174 protrudes from an inside surface of the proximal portion 170a of the cap. The outside diameter of the lip 174 is set to obtain a snap fit between the lip and the inside circumference of the cover body wall 164 when the cap 170 is swung to close the opening at the top of the body wall 164, and pressed downward.

The cap 170 also has an integrally formed distal portion 170b that extends from the proximal portion 170a in an opposite direction from the cover body 162. The distal portion 170b of the cap 170 includes a pair of parallel side walls 176a, 176b, each having a corresponding arcuate cutout 178a, 178b so that the installed fiber 152 can pass inside the distal portion 170b and be concealed from view when the cap 170 is closed as in FIG. 11.

To facilitate positioning and installation of the fastener 150, and as shown in FIG. 10, a strip of double-sided tape 172 is adhered on the outside surface of the bottom wall 166 of the cover body 162, and a release liner 174 is adhered on the exposed side of the tape 172. Once a position for the fastener 150 on the wall 154 in FIG. 11 is determined where the distal end 150b of the fastener body 150a captures the installed fiber 152, the release liner 174 is removed from the tape 172, and the cover 160 is urged against the wall 154. With the cover cap 170 in an open position as in FIG. 9, a suitable metallic mounting screw (e.g., a drywall screw, a multi-purpose SPAX screw, or a Wall Dog screw) is inserted through the central opening 168 in the bottom wall 166 of the cover body 162 and the opening 151 in the overmolded fastener body 150a.

The mounting screw is threaded into the wall 154 and tightened to install the cover 160 and the fastener 150 securely together at the determined position on the wall. The above-mentioned screws are preferable since they can be driven into the wall 154 securely without a separate polymeric screw anchor that could soften and fail at high temperatures. The cap 170 is then swung to close the opening at the top of the cylindrical wall 164 of the cover body 162, and the cap 170 is pressed into the opening. As shown in FIG. 11, the cap 170 then conceals the mounting screw, the fastener body 150a, and the captured fiber 152 at the distal end 150b of the fastener body, from open view.

If molded from a suitable polymer, the fastener cover 160 including the cap 170 can have a variety of colors. For example, if the fiber 152 has a white outer jacket and was initially installed by using of a clear adhesive, and by mounting a number of white point-of-entry (POE) boxes along the hallway wall 154 in FIG. 11, then a white UV resistant polypropylene can be used to mold the cover 160 over the fastener body 150a. When installed on the wall 154, the fastener cover 160 and cap 170 will then match the color of the installed fiber 152 and the POE boxes, and the cover 160 and cap 170 will resist yellowing as well.

A typical installation of either fastener 110, 150 in a hallway or other building location may proceed as follows:

1. Install the fasteners with a 0.3 meter spacing from either side of a given POE box. The straight forward edge 110c or 150c at the distal end of either fastener is preferably positioned adjacent to the ceiling or molding along which the communication line 112 or 152 is adhered. This should inhibit any possible rotation of the fastener, and ensure that the line will not disengage from the fastener if the cover 130 or 160 softens or otherwise fails during a building fire.

2. Install the fasteners about 0.3 meter apart where the installed line passes over doorways (i.e., use three fasteners over each door) if a POE is not present.

3. Use the fasteners at corners. Install a fastener at one side of each inside- or outside-corner bend limiter.

4. Install the fasteners about two or three meters apart on long spans (e.g., down a hallway).

As disclosed herein, the inventive safety fasteners 110, 150 will support installed communication lines including optical fibers and cables and their remnants (e.g., charred jacket material, Kevlar, and/or fiber bundles) in the event of a building fire, and the fasteners will prevent the lines from collapsing and becoming a hazard to firefighters and other responders. Even if polymeric materials used to form the fastener covers 130, 160 should melt, burn, or otherwise decompose during a fire, the underlying metallic fasteners 110, 150 and their metallic mounting screws will stay intact, and the captured lines will not separate from the supporting structure.

While the foregoing represents preferred embodiments of the present invention, it will be understood by persons skilled in the art that various changes, modifications, and additions can be made without departing from the spirit and scope of the invention within the bounds of the following claims.

I claim:

1. A fastener for communication lines, comprising:
an elongated generally flat metallic fastener body having a first opening for passage of a metallic mounting screw, wherein the fastener body has a distal end configured to capture a communication line previously installed along a building surface via an adhesive or non-metallic fasteners; and
a fastener cover including:
a cover body having an open top, and a bottom wall having a second opening for alignment within the first opening in the fastener body when the cover body is disposed over the fastener body, wherein the mounting screw is inserted through the open top of the cover body, the second opening in the bottom wall of the cover body, and the first opening in the fastener body to mount the fastener body and the cover body together on the structural surface at a position where the fastener body captures the installed line and thereby prevents the line from collapsing and interfering with responders if the adhesive or non-metallic fasteners fail during a building fire or otherwise; and
a cap for closing the open top of the cover body, wherein the cover body and the cap are dimensioned and arranged to conceal the fastener body and the mounting screw when the cap is at a closed position;
wherein the cap has an integrally formed distal portion that extends in an opposite direction from the cover body when the cap is closed on the top of the cover body, and the distal portion of the cap is constructed and arranged so that an installed fiber can pass inside the distal portion, and the fiber is concealed at the distal end of the fastener body when the cap is closed.

2. A fastener for communication lines according to claim 1, wherein the fastener body is made of stainless steel.

3. A fastener for communication lines according to claim 1, wherein the cover body is formed of a polymeric material.

4. A fastener for communication lines according to claim 3, wherein the cover body is overmolded on the fastener body.

5. A fastener for communication lines according to claim 4, including a double-sided adhesive tape adhered on a bottom surface of the cover body for positioning the cover body on the building surface when installing the fastener.

6. A fastener for communication lines according to claim 1, wherein the distal portion of the cap includes a pair of parallel side walls each of which has a cutout for passing the installed fiber through each parallel side wall.

7. A fastener for communication lines according to claim 1, wherein the cap is hinged to the body of the fastener cover.

8. A fastener for communication lines, comprising:
an elongated generally flat metallic fastener body having a first opening for passage of a metallic mounting screw, wherein the fastener body has a distal end configured to capture a communication line previously installed along a building surface via an adhesive or non-metallic fasteners; and
a fastener cover including:
a cover body having an open top, and a bottom wall having a second opening for alignment within the first opening in the fastener body when the cover body is disposed over the fastener body, wherein the mounting screw is inserted through the open top of the cover body, the second opening in the bottom wall of the cover body, and the first opening in the fastener body to mount the fastener body and the cover body together on the structural surface at a position where the fastener body captures the installed line and thereby prevents the line from collapsing and interfering with responders if the adhesive or non-metallic fasteners fail during a building fire or otherwise; and
a cap for closing the open top of the cover body, wherein the cover body and the cap are dimensioned and arranged to conceal the fastener body and the mounting screw when the cap is at a closed position;
wherein the cover body includes a circular cylindrical wall, and the cap has a circular lip that protrudes from an inside surface of the cap so that when the cap is pressed into the open top of the cylindrical wall, the cap stays in the closed position.

9. A fastener for communication lines according to claim 8, including a double-sided adhesive tape adhered on a bottom surface of the fastener body for positioning the fastener body on the building surface when installing the fastener.

* * * * *